(12) United States Patent
Speck et al.

(10) Patent No.: US 8,967,582 B2
(45) Date of Patent: Mar. 3, 2015

(54) LONGITUDINAL ADJUSTMENT DEVICE FOR A MOTOR VEHICLE SEAT

(75) Inventors: Axel Speck, Haan (DE); Sascha Eckhoff, Leichlingen (DE); Jens Hoppe, Remscheid (DE)

(73) Assignee: C. Rob Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 13/877,838

(22) PCT Filed: Oct. 5, 2011

(86) PCT No.: PCT/EP2011/067396
§ 371 (c)(1),
(2), (4) Date: Jul. 26, 2013

(87) PCT Pub. No.: WO2012/045778
PCT Pub. Date: Apr. 12, 2012

(65) Prior Publication Data
US 2013/0292539 A1 Nov. 7, 2013

(30) Foreign Application Priority Data

Oct. 5, 2010 (DE) .......................... 10 2010 042 008

(51) Int. Cl.
*F16M 13/00* (2006.01)
*B60N 2/07* (2006.01)

(52) U.S. Cl.
CPC ............ *B60N 2/0722* (2013.01); *B60N 2/0732* (2013.01)
USPC ........................................ 248/424; 297/344.1

(58) Field of Classification Search
USPC ................... 248/424, 429; 297/344.1, 344.11
See application file for complete search history.

(56) References Cited

U.S. PATENT DOCUMENTS

| 5,259,257 | A | * | 11/1993 | Mouri | 248/429 |
| 6,113,051 | A | * | 9/2000 | Moradell et al. | 248/430 |
| 6,869,057 | B2 | * | 3/2005 | Matsumoto et al. | 248/430 |

(Continued)

FOREIGN PATENT DOCUMENTS

| DE | 36 30 680 A1 | 3/1988 |
| DE | 199 18 622 A1 | 11/1999 |

(Continued)

OTHER PUBLICATIONS

International search report received in connection with international application No. PCT/EP2011/067396; dtd Oct. 5, 2012.

(Continued)

*Primary Examiner* — Steven Marsh
(74) *Attorney, Agent, or Firm* — Foley & Lardner LLP

(57) ABSTRACT

A longitudinal adjustment device for a motor vehicle seat, with a floor rail which can be connected to a motor vehicle floor, a seat rail which can be connected to the motor vehicle seat and is mounted in a longitudinally displaceable manner on the floor rail, and a connecting element having a connecting section for connection of a functional component to the seat rail. The connecting element is connected by a first section to a side wall of the seat rail and by a second section to an upper side of the seat rail. The connecting element has an opening for receiving the functional component and/or a bearing element for the arrangement of the functional component. The opening is arranged in the region of a recess running in the region of a bending line between the side wall and the upper side.

12 Claims, 3 Drawing Sheets

(56) References Cited

U.S. PATENT DOCUMENTS

| | | | |
|---|---|---|---|
| 7,780,138 B1 * | 8/2010 | Lee et al. | 248/429 |
| 2006/0249644 A1 * | 11/2006 | Folliot et al. | 248/429 |
| 2007/0096494 A1 | 5/2007 | Hofschulte et al. | |

FOREIGN PATENT DOCUMENTS

| | | |
|---|---|---|
| DE | 100 40 593 A1 | 3/2002 |
| DE | 102 20 951 A1 | 11/2003 |
| DE | 10 2006 040 796 A1 | 3/2007 |
| DE | 11 2007 00 890 T5 | 2/2009 |
| FR | 2879138 A1 | 6/2006 |
| FR | 2880307 A1 | 7/2006 |
| FR | 2910393 A1 | 6/2008 |

OTHER PUBLICATIONS

English Translation of the International Preliminary Report on Patentability received in connection with international application No. PCT/EP2011/067396; dtd Apr. 18, 2013.

* cited by examiner

LONGITUDINAL ADJUSTMENT DEVICE FOR A MOTOR VEHICLE SEAT

CROSS REFERENCE TO RELATED APPLICATIONS

The present application is a National Stage of International Application No. PCT/EP2011/067396 filed on Oct. 5, 2011, which claims the benefit of German Patent Application No. 10 2010 042 008.5 filed on Oct. 5, 2010, the entire disclosures of which are incorporated herein by reference.

The invention relates to a longitudinal adjustment device for a motor vehicle seat, with
- a floor rail connectable with a motor vehicle floor,
- a seat rail connectable with the motor vehicle seat, which
  - is mounted on the floor rail in a longitudinally displaceable manner and
  - has a connecting element having a connecting section for connection of a functional component to the seat rail.

Longitudinal adjustment devices of the initially named type serve the longitudinally adjustable arrangement of a motor vehicle seat on a motor vehicle floor of a motor vehicle. The seat rail connectable with the motor vehicle seat is thereby mounted on the floor rail connectable with the motor vehicle floor in a longitudinally displaceable manner, so that an adjustment of the motor vehicle seat between a front and rear position takes place through an adjustment of the seat rail between its front and rear end position. The rails of a longitudinal adjustment device are normally only in contact with each other in the guide areas via suitable sliding and/or rolling bodies and are otherwise arranged at a distance from each other.

As a result of the constant optimization pressure with respect to installation space, known longitudinal adjustment devices meanwhile are no longer just for the adjustable arrangement of the motor vehicle seat in the motor vehicle. It is thus for example already normal to design the seat rail such that it permits the connection of a functional component, for example a linkage. For this, a linkage holder is preferably fastened on the seat rail or the linkage is connected with it in a pivoting manner via lateral recesses on the seat rail. Such connections of functional components like those of linkages have disadvantages. Among other things, an increased pack size thus results from the use of a linkage holder placed on the seat rail. A lateral attachment with recesses provided for this results in that the load in normal mode but also in the case of a crash is not distributed evenly on the rails but rather one-sided on the side of the seat rail, which is provided for the lateral attachment.

Based on this, the object of the invention is to provide a longitudinal adjustment device, which permits a stable connection of a functional component, in particular a linkage.

The invention solves the object through a longitudinal adjustment device with the characteristics of claim 1. Advantageous further embodiments of the invention are specified in the dependent claims.

Characteristic for the longitudinal adjustment device according to the invention is that the connecting element is connected with a first section with a side wall of the seat rail and with a second section with an upper side of the seat rail, wherein the connecting element has an opening for receiving the functional component and/or a bearing element, wherein the opening is arranged in the area of a recess running in the area of a bending line between the side wall and the upper side. The seat rail of the longitudinal adjustment device has an upper side. The side wall of the seat rail extends—with respect to the installation position in the motor vehicle—in a mainly vertical direction between the motor vehicle seat and the vehicle floor. The connecting element, which fastens any functional components on the seat rail, in particular a linkage, has a first section, which is connected with the side wall of the seat rail, and a second section, which is connected with the upper side of the seat rail.

The connection of the connecting element according to the invention via two surfaces of the seat rail arranged displaced with respect to each other, namely the upper side and the side wall, ensures a particularly reliable arrangement of the connecting element on the seat rail. The connecting element itself in turn has a connecting section, which is designed to receive the functional component provided for connection with the seat rail. Due to the possibility of designing the connecting section independently of the seat rail on any position on the connecting element, the pack mass of a seat adjustment device—which is understood as the distance between the bottom edge of the floor rail and the H point—can be considerably reduced with respect to the known seat adjustment devices. Moreover, the connecting element reinforces the area of the seat rail, via which the crash-caused loads are fed to the seat rail in the case of an accident, whereby a structural failure of the seat rail can be prevented in a special manner.

The connecting element can be dimensioned taking into consideration the connecting sections coordinated for the seat rail and depending on the connecting element to be arranged on it. The connecting element thereby compensates for the hereby resulting structural weakness in the case of its connection with an engagement in the structure of the seat rail, as is the case e.g. with rivets or screws. Moreover, it enables the connecting element to perform a positioning of the functional component independently of the structure of the seat rail via the freely selectable arrangement of the connecting section. Another advantage of the connecting element is that the sliding and/or rolling bodies used to guide the seat rail on a floor rail are subject to an even surface pressure due to the distributed load allocation occurring via the connecting element.

According to the invention, the connecting element also has an opening for receiving the functional component, for example a linkage and/or a bearing element for the arrangement of the functional component. Accordingly, an opening is arranged in the connecting section, which enables the direct arrangement of the functional component and/or the connection of a bearing element, via which the functional component can be connected, if applicable, in a jointed manner with the connecting element. The opening can thereby be designed in any manner and in any shape taking into consideration the functional component to be connected. Thus, the opening can be designed both for jointed arrangement but can also enable a rigid fastening through a e.g. polygonal design of the opening.

The opening for receiving the functional component and/or bearing element is arranged according to the invention in the area of a recess running in the area of a bending line between the side wall and the upper side. The use of the connecting element according to the invention also makes it possible, in the case of a seat rail made of a steel sheet, to arrange the functional component in the area of the bending line between the side wall and the upper side of the seat rail. The opening provided for this thereby runs on the connecting element in the area of a recess arranged at this position. The connecting element thus ensures the secure connection possibility of the functional component, in particular a linkage, in an area, namely of the bending line, which would not be suitable for connection without the use of a connecting element. Moreover, a collision with cover elements arranged on the floor rail, e.g. plastic covers, as are known from the state of the art, are avoided in particular in the case of a lateral arrangement of the linkages. The opening can thereby be designed in particular corresponding with the recess, whereby the connection of a bearing element is possible, which extends through the opening and the recess. The arrangement in the area of the bending line has a higher stability with respect to an arrangement offset in the direction of the vehicle floor with respect to the installation position in the motor vehicle, wherein in particular a load-caused displacement of the side wall in the direction of the hollow space formed by the seat rail and the floor rail is prevented in a special manner.

The connecting element is connected with the seat rail via the side wall and the upper side of the seat rail. The connection type can thereby generally be freely selected, wherein e.g. the connecting element can also be welded or glued to the seat rail. In accordance with a particularly advantageous embodiment of the invention, the connecting element is however connected in a form-fit manner with the seat rail in sections. According to this embodiment, the first and/or second section of the connecting element has areas that work together with the side wall or respectively upper side in a form-fit manner. For example, projections can be arranged on the first and/or second section, which can engage in corresponding recesses or openings on the upper side or side wall of the seat rail, whereby a particularly reliable connection of the connecting element can be realized on the seat rail. The form-fit connection can thereby be used for exclusive connection of the connecting element but can also be combined with other connection types.

As already shown above, the connecting element can also be designed in any manner in the case of the form-fit connection of the connecting element on the seat rail. According to a particularly advantageous embodiment of the invention, the connecting element however has a projection arranged in a recess in the side wall of the seat rail. Recesses can be formed by recesses incorporated in the surface of the seat rail but also by openings penetrating the upper side and/or side wall. This embodiment of the invention ensures a particularly reliable arrangement of the connecting element in the direction of the longitudinal axis of the seat rail and in the vertical direction with respect to the installation position in the motor vehicle.

The arrangement of the projection on the connecting element can be freely selected according to the expected loads as well as constructive framework conditions. According to a particularly advantageous embodiment of the invention, the projection is however arranged in the area of the connecting section of the connecting element. According to this embodiment of the invention, the projection serves, in addition to the pure fixing of the connecting element on the seat rail, at least in sections for the design of the connecting section of the connecting element for the functional component. The projection thereby fulfills a reinforcing function of the connecting section. A particularly even force transmission from the functional component via the connecting element to the seat rail simultaneously results from the not solely planar attachment of the connecting section on the seat rail.

The embodiment of the connecting element such that it is connected with the first section on the side wall of the seat rail and with the second section with the upper side of the seat rail is generally freely selectable. Thus, the connecting element can be formed for example by a correspondingly L-shaped angled mold, which has two contact surfaces running mainly at a right angle to each other. According to a particularly advantageous embodiment of the invention, the connecting element however has a base body having the first section with a base plane and a bar connecting to the base body, running offset to the base plane and having the second section, wherein the base body with a contact surface running parallel to the base plane rests on the side wall and the bar with an inner edge running perpendicular to the base plane rests on the upper side.

According to this embodiment of the invention, the connecting element is formed by a mainly even body. The base body of the connecting element, which provides the base plane of the connecting element, rests with a contact surface running parallel to the base plane on the side wall of the seat rail. For the arrangement of the connecting element on the upper side of the seat rail, a bar extending from an area of the base body carrying the upper side of the seat rail, wherein it runs displaced with respect to the plane of the base body, namely the base plane, such that it lies with an inner edge progressing perpendicular to the base plane on the upper side. Through this embodiment of the connecting element, a particularly high stability is ensured and a deformation of the connecting element is also reliably avoided.

According to a particularly advantageous embodiment of the invention, two bars running displaced with respect to the base plane connect to the base body on opposite-lying sides, which rest with their inner edges on the upper side. According to this embodiment of the invention, in which the bars extend wing-like from the base body in opposite directions and lie on the upper side of the seat rail, a particularly reliable power transmission is ensured from the connecting element to the upper side of the seat rail. The length of the bars can thereby be freely selected depending on the constructive specifications. An asymmetrical dimensioning of the bars, whereby one bar has a higher length than the other bar, is thereby generally possible.

As already explained above, for arrangement on the side wall of the seat rail the connecting element has a base body, which lies on the side wall with a contact surface running parallel to its base plane. The shape of the base body is thereby generally freely selectable. Thus, it can have e.g. a rectangular, square or any polygonal shape. According to a particularly advantageous embodiment of the invention, two connecting links running in the base plane connect to the base body on opposite sides of the base body. The connecting links ensure a particularly reliable support of the connecting element on the side wall of the seat rail. The connecting links thereby extend in the longitudinal direction of the seat rail in a particularly advantageous manner. Like the bars lying on the upper side of the seat rail, the connecting links can also be designed symmetrically or asymmetrically, which permits in a special manner an adjustment of the connecting element for the constructive specifications.

The production of the connecting element with its first and second section can generally take place in any manner. The connecting element can thus also be made of different components. According to a particularly advantageous embodiment of the invention, the connecting element is however designed as one piece. The one-piece design ensures a particularly high stability of the connecting element. Particularly advantageously, the connecting element is thereby formed from a steel sheet, which is accordingly designed by suitable bending processes. Besides the high stability of the connecting element, this embodiment of the invention is also characterized in that the connecting element can be produced particularly easily and cost-effectively.

The design of the seat rail, as well as the floor rail, is generally freely selectable. They can thus be made of any materials and using any production processes. According to a particularly advantageous embodiment of the invention, the seat rail is however made of a bent flat material, in particular sheet steel. Particularly advantageously, the seat rail also has a U-profile created by bending processes, which is arranged displaceably in a floor rail preferably also made of a flat material having a U-shaped cross-section. An accordingly designed seat rail is characterized by its high stability, little installation space and low weight. The relatively free selection of the bending processes thereby ensures a particularly advantageous attachment of the seat rail to the floor rail, which ensures the function of the longitudinal adjustment device in a special manner.

In the case of the arrangement of a projection, it is arranged in a recess running in the area of the bending line between the side wall and the upper side according to a particularly advantageous embodiment of the invention. According to this embodiment of the invention, the projection extends through or respectively into the recess, which runs in the bending area in the seat rail made of a flat material. The projection and the recess thereby preferably have a coordinated form, wherein besides a circular design, a polygonal design is also possible, which enables a particularly reliable arrangement of the connecting element via the projection in the recess.

Particularly advantageously, the projection is also designed to receive the functional component and/or a bearing element for the arrangement of the functional component, in particular a bearing bolt, wherein the projection particularly preferably has the opening for the connection of the functional component. To this degree, the projection does not just serve for the form-fit arrangement, but rather also assumes mounting functions, wherein the projection is designed according to the functional component to be arranged or respectively the bearing element. The projection can thus have for example a mounting opening, into which e.g. a bearing bolt is pressed or screwed. The arrangement of the projection in the area of the bending line thereby ensures—as already stated above—a particularly high stability due to the power flow in this area.

According to a further embodiment of the invention, a bearing bushing is arranged on the bearing element, in particular a bearing bolt. The embodiment of the invention is characterized by the possibility of a jointed arrangement of a connection element, wherein the bearing bushing enables a particularly slide-free relative movement of the functional component on the connecting element.

One exemplary embodiment of the invention is explained below with reference to the drawings. The drawings show the following:

Figure 1:
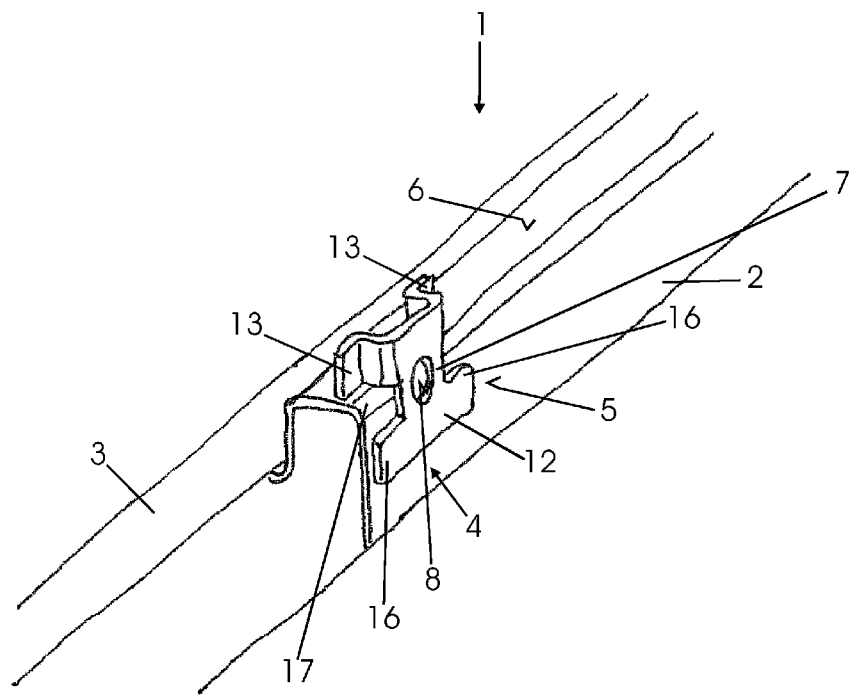
FIG. 1 shows a sketch of a perspective view of an adjustment device with a connecting element arranged on a seat rail.
Figure 2:
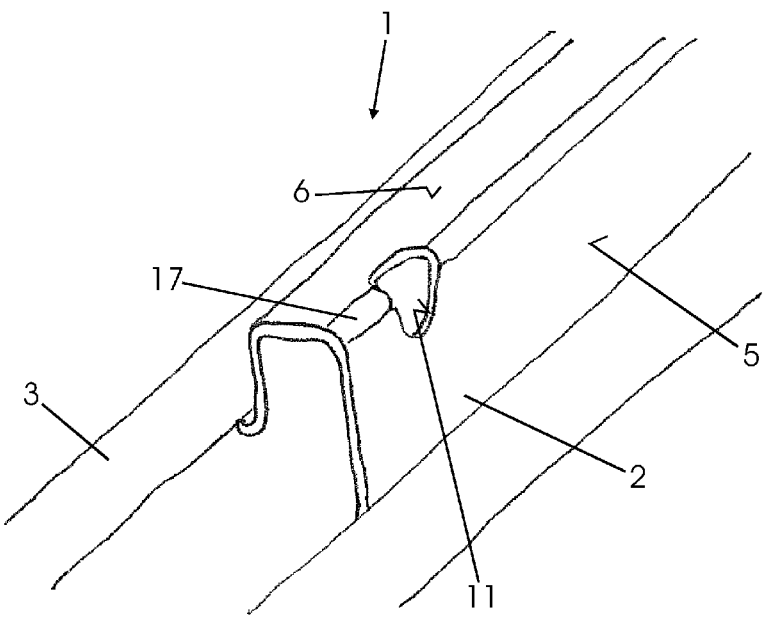
FIG. 2 shows a sketch of a perspective view of an adjustment device from FIG. 1 without the connecting element.
Figure 3:
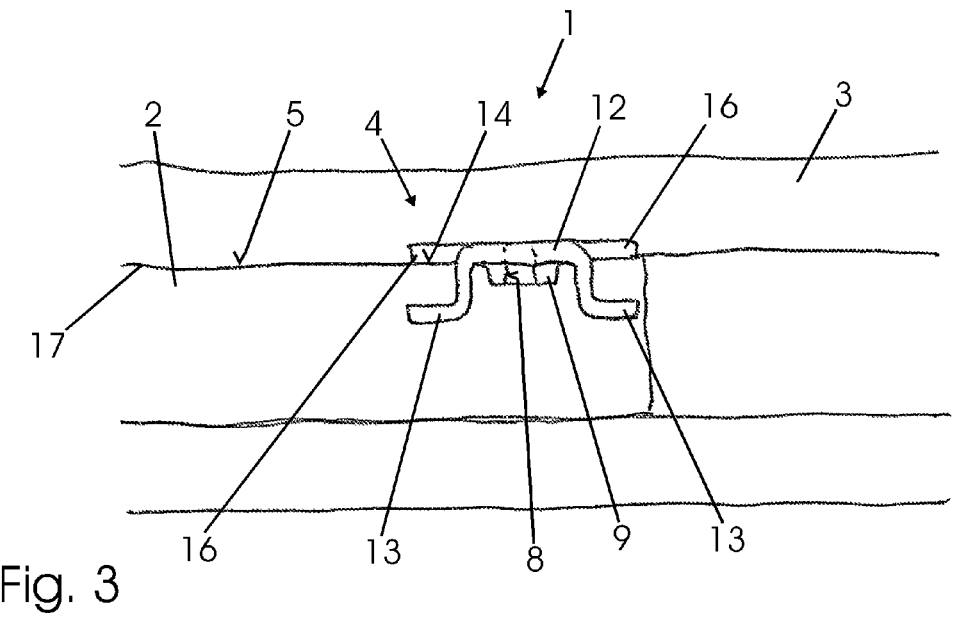
FIG. 3 shows a sketch of a top view of the adjustment device from FIG. 1.
Figure 4:
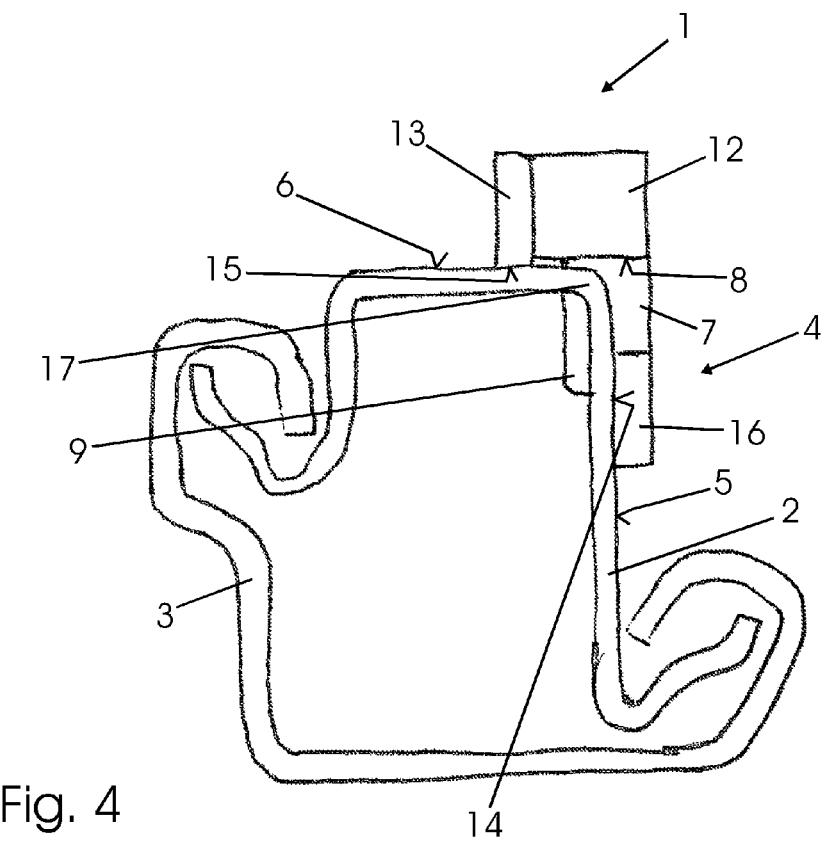
FIG. 4 shows a sketch of a front view of the adjustment device from FIG. 1.
Figure 5:
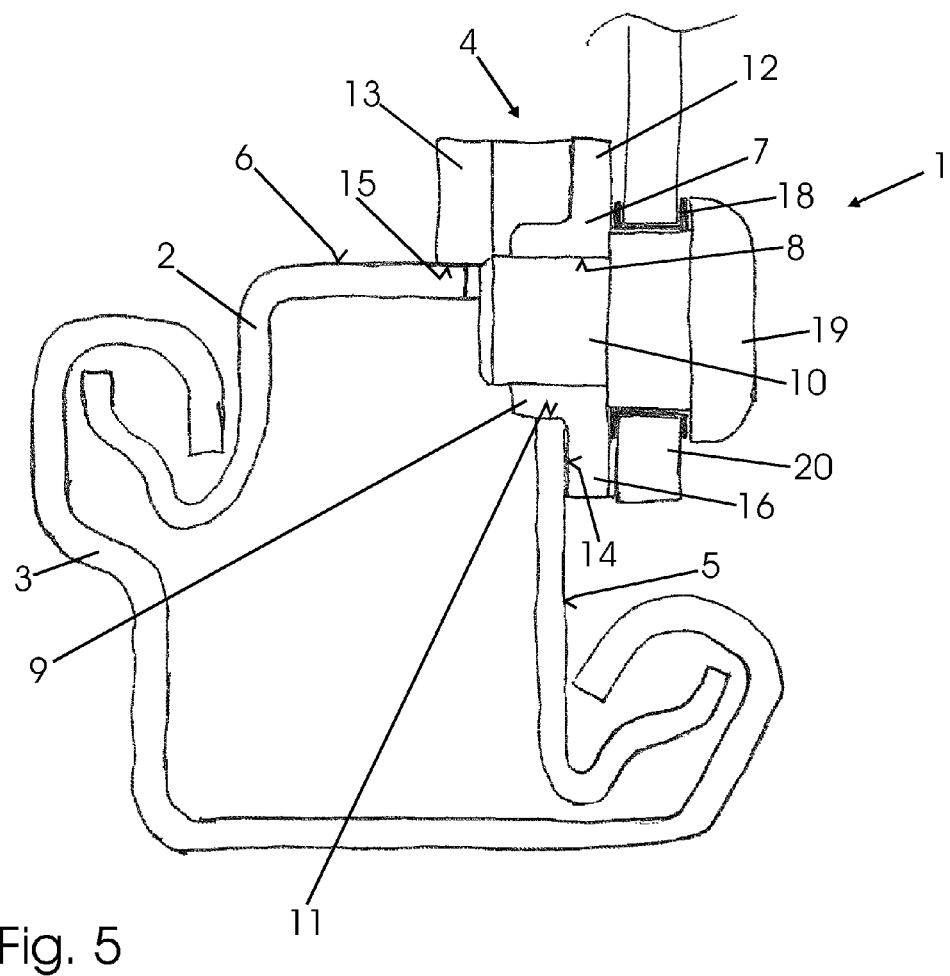
FIG. 5 shows a sketch of a cut of the adjustment device from FIG. 1 through the connecting element with a linkage arranged on the connecting element.

A section of a longitudinal adjustment device 1 having a seat rail 2 and a floor rail 3 is sketched in FIG. 1. For the longitudinally adjustable arrangement of a motor vehicle seat not shown here, the seat rail 2 connectable with the motor vehicle seat is mounted on the floor rail 3 connectable with the motor vehicle floor. The longitudinally adjustability of the seat rail 2 with respect to the floor rail 3 thus enables a user to adjust the position of the motor vehicle seat in the motor vehicle.

The seat rail 2 and the floor rail 3 are formed from a U-shaped bent sheet profile, wherein its bending progression is designed such that the ends of the rails 2, 3 that are free in cross-section engage in each other, whereby the seat rail 2 are fixed on each other displaceably. A longitudinal adjustment of the motor vehicle seat not shown here with respect to the vehicle floor takes place via a longitudinal adjustment of the seat rail 2 with respect to the floor rail 3, wherein they are only in contact with each other in certain guide areas via rolling bodies not shown here, through which the seat rail 2 is fixed with respect to the floor rail 3. In the other area, the floor rail 3 and the seat rail 2 are arranged at a distance from each other due to the mounting via the rolling bodies (see FIG. 2-5).

The seat rail 2 connectable with an upper side 6 with a motor vehicle seat has a connecting element 4 in the area of—with respect to the installation position in the motor vehicle—its rear end, which enables the connection of functional components, e.g. a linkage 20, to a connecting section 7 of the connecting element 4.

For the connection of the connecting element 4 with the seat rail 2, the seat rail 2 has a recess 11, which is arranged in the area of the bending line 17 between the side wall 5 and the upper side 6 of the seat rail 2 formed from a steel sheet. The connecting element 4 in turn has a projection 9, which is adjusted for the recess 11 so that the projection 9 is arranged in the installed position of the connecting element 4 on the seat rail 2 within the recess 11, wherein this can also take place contact-free.

Moreover, the connecting element 4 has a base body 12, which extends in a base plane running mainly parallel to the side wall 5. With a contact surface 14, the base body 12 as well as connecting links 16 extending in the longitudinal direction of the seat rail 2, starting from the base body 12, lie on the side wall 5 of the seat rail 2.

The base body 12 extends further in the installation position on the seat rail 2—with respect to the installation position in the motor vehicle—section-wise beyond the upper side 6 of the seat rail 2. In this area, two bars 13, which run displaced with respect to the base plane of the base body 12 so that they lie with their inner edges 15 on the upper side 6 of the seat rail 2, connect to the base body 12—with respect to the longitudinal direction of the seat rail 2—on opposite edges.

In the connection area 7, which serves to arrange the functional component on the connecting element 4, it has the projection 9, which extends through the recess 11 on the seat rail 2 in the installed position on the seat rail 2. For receiving the functional component to be arranged on the seat rail 2, e.g. a linkage 20, the projection 9 also has an opening 8, which extends through the connecting element 4. The opening 8 serves to receive a bearing element designed as a bearing bolt 10, on which a linkage 20 is arranged in a jointed manner. In order to thereby ensure a frictionless mounting of the linkage 20, a bearing bushing 18 is arranged in an area between the connecting element 4 and a bolt head 19.

The invention claimed is:

1. A longitudinal adjustment device for a motor vehicle seat, comprising:
   a floor rail connectable with a motor vehicle floor,
   a seat rail connectable with the motor vehicle seat, which
      is mounted on the floor rail in a longitudinally displaceable manner,
      has a side wall that provides an outer face of the seat rail,
      has an upper side, and
      has a connecting element having a connecting section for connecting a functional component to the seat rail,
   wherein the connecting section has at least a first section and a second section, wherein the first section is connected to the outer face provided by the side wall of the seat rail and the second section is connected to the upper side of the seat rail, wherein the connecting element has an opening for receiving the functional component and/or a bearing element for the arrangement of the functional component, wherein the opening is arranged in the area of a recess of the seat rail in the area of a bending line between the side wall and the upper side, wherein the opening corresponds with the recess, whereby a connection with the functional component and/or the bearing element is possible, wherein the functional component and/or the bearing element extends through the opening and the recess at least partially in the area of the bending line.

2. The longitudinal adjustment device according to claim 1, the connecting element is connected section-wise in a form-fit manner with the seat rail.

3. The longitudinal adjustment device according to claim 1, wherein the connecting element has a projection arranged in a recess in the side wall of the seat rail.

4. The longitudinal adjustment device according to claim 3, wherein the projection is arranged in the area of the connecting section of the connecting element.

5. The longitudinal adjustment device according to claim 1, wherein the connecting element has a base body with a base plane having the first section and a bar connecting to the base body, displaced with respect to the base plane, having the second section, wherein the base body lies with a contact surface running parallel to the base plane on the side wall and the bar with an inner edge running perpendicular to the base plane on the upper side.

6. The longitudinal adjustment device according to claim 5, wherein two bars running displaced with respect to the base plane, which lie with their inner edges on the upper side, connect on opposite sides of the base body.

7. The longitudinal adjustment device according to claim 5, wherein two connecting links running in the base plane connect to the base body in the area of the first section on opposite sides of the base body.

8. The longitudinal adjustment device according to claim 1, wherein the connecting element is designed as one piece.

9. The longitudinal adjustment device according to claim 1, wherein the seat rail is formed from a bent flat material.

10. The longitudinal adjustment device according to claim 3, wherein the projection is arranged in the recess running in the area of the bending line between the side wall and upper side.

11. The longitudinal adjustment device according to claim 3, wherein the projection is designed for receiving the functional component and/or a bearing element for the arrangement of the functional component and has the opening.

12. The longitudinal adjustment device according to claim 1, wherein a bearing bushing is arranged on the bearing element.

* * * * *